United States Patent [19]

Raue

[11] Patent Number: 4,496,719
[45] Date of Patent: Jan. 29, 1985

[54] 3H-INDOL-2-YL CATIONIC HYDRAZONE DYESTUFFS

[75] Inventor: Roderich Raue, Leverkusen, Fed. Rep. of Germany

[73] Assignee: Bayer Aktiengesellschaft, Leverkusen, Fed. Rep. of Germany

[21] Appl. No.: 466,709

[22] Filed: Feb. 15, 1983

[30] Foreign Application Priority Data

Mar. 2, 1982 [DE] Fed. Rep. of Germany ....... 3207477

[51] Int. Cl.³ .................. C07D 209/12; C07D 403/12
[52] U.S. Cl. ................................................. 548/455
[58] Field of Search ............... 542/417; 544/143, 144, 544/194, 198; 548/460, 461

[56] References Cited

U.S. PATENT DOCUMENTS

| 3,345,355 | 10/1967 | Raue ................................... 548/460 |
| 3,773,764 | 11/1973 | Lehment et al. ..................... 542/417 |
| 3,957,765 | 5/1976 | Hofer et al. ......................... 542/417 |

FOREIGN PATENT DOCUMENTS

| 0044061 | 1/1982 | European Pat. Off. ............ 548/460 |
| 1133053 | 7/1962 | Fed. Rep. of Germany ...... 548/460 |

*Primary Examiner*—Henry R. Jiles
*Assistant Examiner*—J. G. Mullins
*Attorney, Agent, or Firm*—Sprung, Horn, Kramer & Woods

[57] ABSTRACT

Hydrazone dyestuffs of the formula

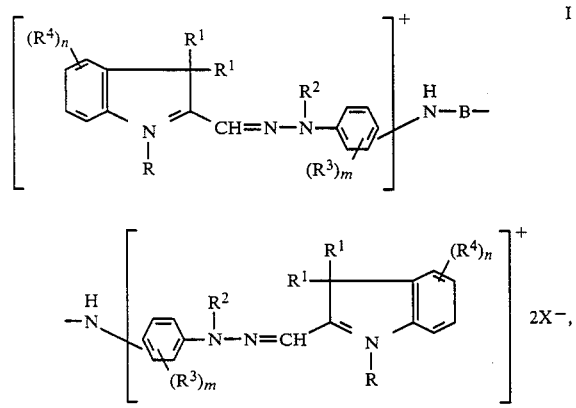

in which
R denotes optionally substituted alkyl,
R¹ denotes alkyl and the two radicals can form a closed ring,
R² denotes optionally substituted alkyl,
R³ denotes alkyl, alkoxy or halogen,
R⁴ denotes alkyl, halogen, alkoxy, phenoxy, benzyloxy, benzyl, carboxyl, alkyl carboxylate, carboxamide, sulphonamide, alkylsulphonyl, phenylsulphonyl, cyano, nitro, trifluoromethyl, acetyl or benzoyl, B denotes

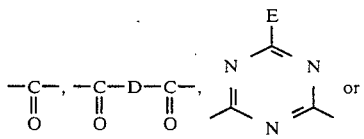

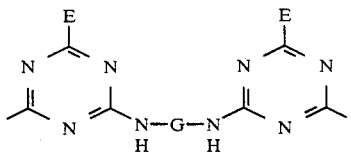

D denotes alkylene, phenylene or naphthylene,
E denotes halogen, hydroxyl, alkoxy or

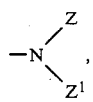

Z and Z¹ denote hydrogen or —Y—Z²,
Y denotes alkylene,
Z² denotes hydrogen, hydroxyl, pyridinium,

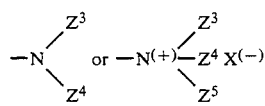

Z³, Z⁴ and Z⁵ denote hydrogen or optionally substituted alkyl,
Z³ also denotes phenyl, benzyl or

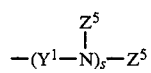

Y¹ denotes alkylene and
s denotes 1–8, or
Z and Z¹ as well as Z³ and Z⁴ form a closed ring,
G denotes alkylene, phenylene or
G denotes alkylene, phenylene or

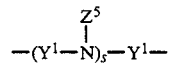

m and n denote 0, 1 or 2 and
X(−) denotes an anion, are used in particular for dyeing paper.

5 Claims, No Drawings

3H-INDOL-2-YL CATIONIC HYDRAZONE DYESTUFFS

The invention relates to cationic hydrazone dyestuffs of the general formula

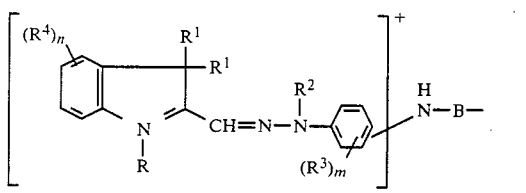

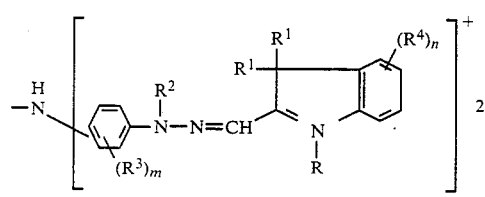

in which

R represents an alkyl radical which has 1 to 4 C atoms and is optionally substituted by hydroxyl, alkoxy having 1 to 4 C atoms, acyloxy, halogen, cyano, carboxyl, $C_1$- to $C_4$-carbalkoxy, carboxamido or acetyl, $R^1$ represents an alkyl radical which has 1 to 4 C atoms and the two radicals can also form a closed ring, $R^2$ represents an alkyl radical which has 1 to 4 C atoms and which can be substituted by hydroxyl, $R^3$ represents an alkyl radical having 1 to 4 C atoms, an alkoxy radical having 1 to 4 C atoms or halogen, $R^4$ represents an alkyl radical having 1 to 4 C atoms, halogen, alkoxy having 1 to 4 C atoms, phenoxy, benzyloxy, benzyl, carboxyl, an alkyl carboxylate having 1 to 4 C atoms, a carboxamide group which is optionally substituted by 1 or 2 $C_1$- to $C_4$-alkyl radicals, a sulphonamide group which is optionally substituted by 1 or 2 $C_1$- to $C_4$-alkyl radicals, alkylsulphonyl having 1 to 4 C atoms, phenylsulphonyl or a cyano, nitro, trifluoromethyl, acetyl or benzoyl group, B corresponds to a radical of the formulae

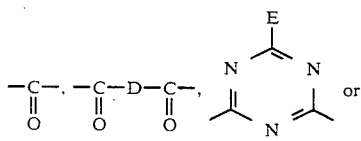

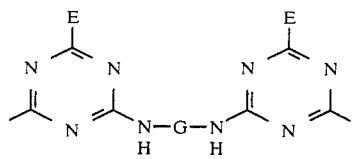

in which

D represents an alkylene radical having 2 to 6 C atoms or a phenylene or a naphthylene radical, E represents halogen, hydroxyl, alkoxy having 1–4 C atoms or the radical

Z and $Z^1$ independently of each other represent hydrogen or the radical $-Y-Z^2$, Y represents alkylene having 1 to 6 C atoms, $Z^2$ represents hydrogen, hydroxyl, pyridinium or the radicals

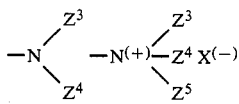

$Z^3$, $Z^4$ and $Z^5$ independently of one another represent hydrogen or optionally hydroxyl-substituted alkyl having 1 to 4 C atoms, $Z^3$ also represents phenyl, benzyl or the radical

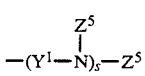

$Y^1$ represents alkylene having 2–4 C atoms and s represents 1–8, or

Z and $Z^1$ as well as $Z^3$ and $Z^4$ can form closed rings and together with the N atom a pyrrolidine, morpholine, piperidine or piperazine ring which can be substituted by $C_1$- to $C_4$-alkyl or amino-$C_1$- to $C_4$-alkyl, G represents an alkylene radical having 2 to 6 C atoms, a phenylene radical or a radical of the formula

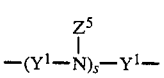

m and n represent 0, 1 or 2 and $X^{(-)}$ represents an anion, their preparation, agents containing them, and their use for dyeing natural and synthetic cationically dyeable substrates and compositions, in particular paper.

A preferable group of the new dyestuffs corresponds to the general formula

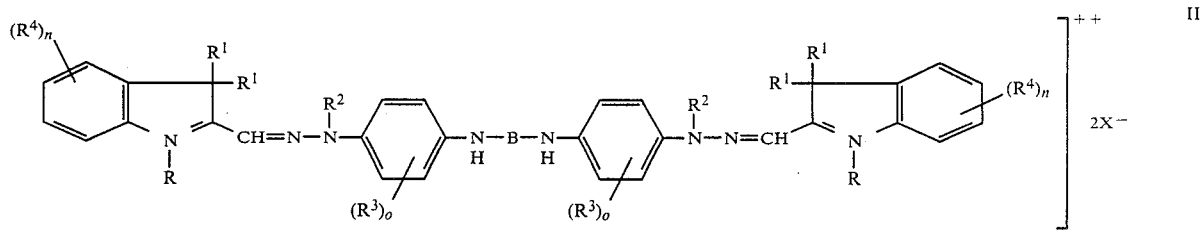

in which the radicals R, $R^1$, $R^2$, $R^3$, $R^4$, B, X and n have the same meaning as in the formula I and o represents 0 or 1.

Of these dyestuffs, preferable compounds in turn have the general formula

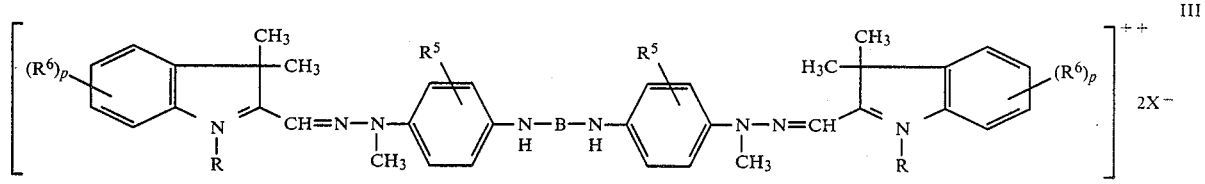

in which

R, B and X have the same meaning as in the formula I, $R^5$ represents hydrogen, methyl or chlorine, $R^6$ represents hydrogen, chlorine, methyl, methoxy or ethoxy and p represents 0 or 1.

A further group of dyestuffs of the general formula I corresponds to the general formula

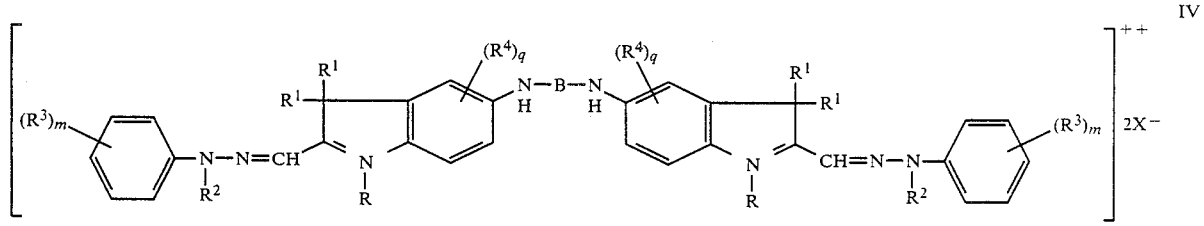

in which

R, $R^1$, $R^2$, $R^3$, $R^4$, B, X and m have the same meaning as in the formula I and q represents 0 or 1.

Of these dyestuffs, preferable dyestuffs in turn have the general formula

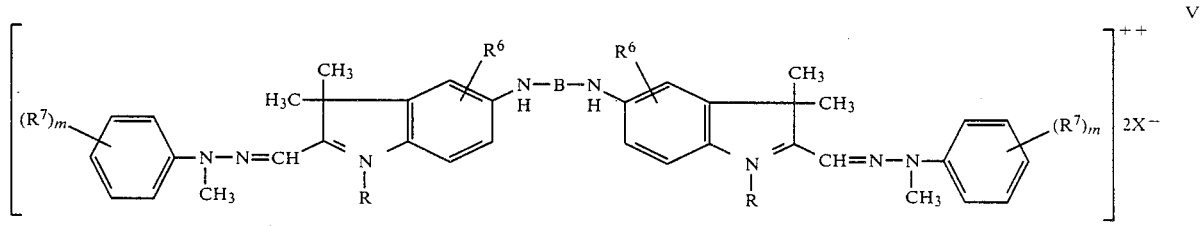

wherein

R, B, X and m have the same meaning as in the formula I, $R^6$ has the same meaning as in the formula III and $R^7$ represents hydrogen, chlorine, methyl, methoxy or ethoxy.

Dyestuffs according to the invention also include polymeric compounds of the general formula

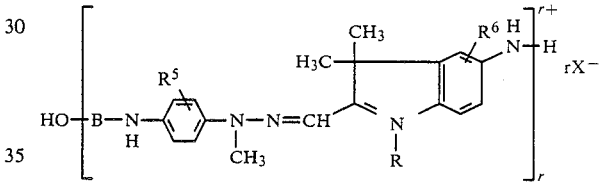

in which

R, $R^5$, $R^6$, B and X have the same meaning as in the formula III and r represents 2 to 6.

In the formulae I to VI, halogen preferably represents fluorine, chlorine or bromine.

Acyl is understood as meaning in particular acetyl, propionyl, benzoyl or carbamoyl.

The two radicals R¹ together can, for example, form a cyclopentyl or cyclohexyl ring.

E preferably represents the radical

NH—Z⁶

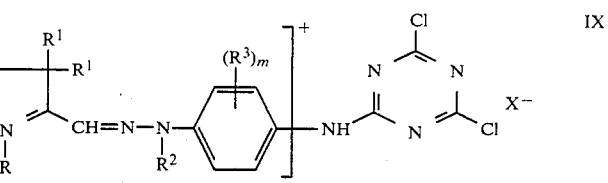

in which Z⁶ denotes hydrogen, alkyl having 1 to 4 C atoms, hydroxyalkyl having 2 to 4 C atoms or the radicals

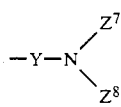

or —(Y³—NH)$_t$—H with Y²=alkylene having 2 to 6 C atoms,

Z⁷ and Z⁸=hydrogen, alkyl having 1 to 4 C atoms or hydroxyalkyl having 2 to 4 C atoms, Y³=alkylene having 2 to 3 C atoms and t=2-5.

E represents in particular chlorine.

G preferably represents an alkylene radical having 2 to 6 C atoms or the radical

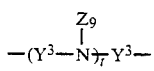

with Z⁹=hydrogen or alkyl having 1 to 4 C atoms.

The new dyestuffs are obtained by reacting hydrazone dyestuffs of the general formula

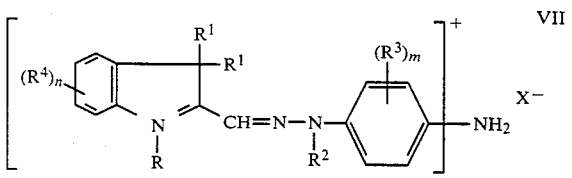

VII in which R, R¹, R², R³, R⁴, X, m and n have the same meaning as in the formula I, with dihalogen compounds of the general formula Hal—B—Hal    VIII in which B has the same meaning as in the formula I and Hal represents halogen, in an aqueous or organic solution with the addition of acid-binding agents.

Examples of suitable compounds of the general formula VIII are phosgene, succinyl dichloride, glutaryl dichloride, adipoyl dichloride, terephthaloyl dichloride, isophthaloyl dichloride, cyanuric chloride, cyanuric bromide, cyanuric fluoride and compounds which are obtained by reacting 2 mols of cyanuric chloride with 1 mol of 1,4-phenylenediamine, 1,3-phenylenediamine, ethylenediamine, 1,4-diaminobutane, 1,6-diaminohexane, diethylenetriamine, triethylenetetramine, tetraethylenepentamine, pentaethylenehexamine, bisaminoethylmethylamine, bisaminoethylethylamine and bisaminoethylbutylamine.

It is also possible first to react compounds of the formula VII with cyanuric chloride in a molar ratio of 1/1 to give compounds of the general formula

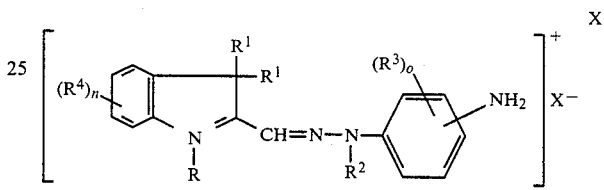

IX and then to react these compounds with a diamine in a molar ratio of 2/1.

A preferable group of starting materials according to the invention corresponds to the general formula

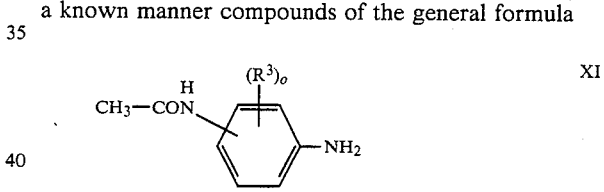

X in which R, R¹, R², R³, R⁴, X, o and n have the same meaning as in the formula II.

These starting materials are obtained by diazotising in a known manner compounds of the general formula

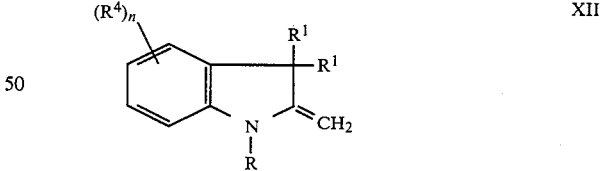

XI in which R³ and o have the same meaning as in the formula X, coupling the diazotised product with compounds of the formula

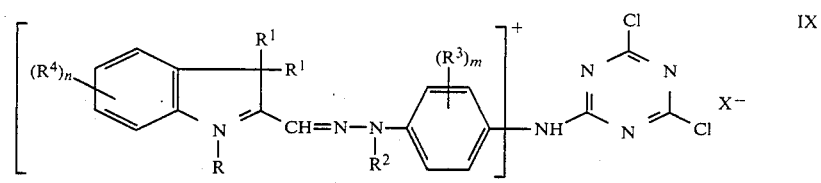

XII in which R, R¹, R⁴ and n have the same meaning as in the formula X, to give azo dyestuffs, converting the latter into the dye bases by means of acid-binding agents, then reacting these dye bases with alkylating agents, and splitting off the acetyl group by heating in an acidic medium.

Examples of suitable starting materials of the general formula XI are 4-aminoacetanilide, 2-chloro-4-aminoacetanilide, 3-chloro-4-aminoacetanilide, 2-methyl-4-aminoacetanilide, 3-methyl-4-aminoacetanilide, 2-methoxy-4-aminoacetanilide, 3-methoxy-4-aminoacetanilide, 3-aminoacetanilide, 3-amino-4-chloroacetanilide, 3-amino-4-methylacetanilide and 3-amino-4-methoxyacetanilide.

Examples of suitable compounds of the general formula XII are 1,3,3-trimethyl-2-methylene-indoline, 1,3,3,5-tetramethyl-2-methylene-indoline, 1,3,3,7-tetramethyl-2-methylene-indoline, 1,3,3-trimethyl-5-chloro-2-methylene-indoline, 1,3,3-trimethyl-7-chloro-2-methyleneindoline, 1,3,3-trimethyl-5,7-dichloro-2-methyleneindoline, 1,3,3-trimethyl-5-bromo-2-methylene-indoline, 1,3,3-trimethyl-5-methoxy-2-methylene-indoline, 1,3,3-trimethyl-5-ethoxy-2-methylene-indoline, 1,3,3-trimethyl-5-hydroxyethoxy-2-methylene-indoline, 1,3,3-trimethyl-5-methoxy-7-chloro-2-methylene-indoline, 1,3,3-trimethyl-5-phenoxy-2-methylene-indoline, 1,3,3-trimethyl-5-benzyloxy-2-methylene-indoline, 1,3,3-trimethyl-5-(4-chlorophenoxy)-2-methylene-indoline, 1,3,3-trimethyl-5-benzyl-2-methylene-indoline, 1,3,3-trimethyl-5-carbomethoxy-2-methylene-indoline, 1-ethyl-3,3-dimethyl-5-carboethoxy-2-methylene-indoline, 1,3,3-trimethyl-5-cyano-2-methyleneindoline, 1,3,3-trimethyl-5-methylsulphonyl-2-methyleneindoline, 1,3,3-trimethyl-5-nitro-2-methylene-indoline, 1,3,3-trimethyl-5-acetyl-2-methylene-indoline, 1,3,3-trimethyl-5-benzoyl-2-methylene-indoline, 1-chloroethyl-3,3-dimethyl-2-methylene-indoline and 1-acetoxyethyl-3,3-dimethyl-2-methylene-indoline.

Examples of suitable alkylating agents are dimethyl sulphate, diethyl sulphate, methyl benzenesulphonate, ethyl benzenesulphonate, methyl p-toluenesulphonate, ethyl p-toluenesulphonate, butyl bromide, ethylene oxide and propylene oxide.

A further group of starting materials according to the invention corresponds to the general formula:

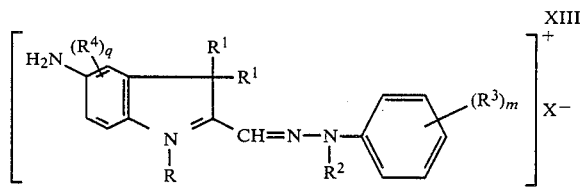

in which R, $R^1$, $R^2$, $R^3$, $R^4$, X, m and q have the same meaning as in the formula IV.

These compounds are obtained by diazotising in a way which is in itself known compounds of the general formula

in which $R^3$ and m have the same meaning as in the formula IV, coupling the diazotised product with compounds of the formula

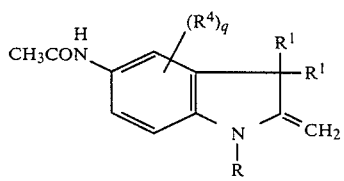

in which R, $R^1$, $R^4$ and q have the same meaning as in the formula IV to give azo dyestuffs, converting these into the corresponding dye bases by means of acid-binding agents, treating these dye bases with alkylating agents, and then splitting off the acetyl group by heating in an acidic medium.

Examples of suitable compounds of the general formula XIV are aniline, 2-methylaniline, 3-methylaniline, 4-methylaniline, 3,4-dimethylaniline, 2-methoxyaniline, 3-methoxyaniline, 4-methoxyaniline, 2,4-dimethoxyaniline, 2,5-dimethoxyaniline, 4-ethoxyaniline, 2-chloroaniline, 3-chloroaniline, 4-chloroaniline, 2-chloro-4-methoxyaniline and 2-chloro-4-ethoxyaniline.

Examples of suitable compounds of the general formula XV are 1,3,3-trimethyl-5-acetylamino-2-methyleneindoline, 1,3,3-trimethyl-5-acetylamino-7-chloro-2-methylene-indoline, 1,3,3-trimethyl-5-acetylamino-7-methoxy-2-methylene-indoline, 1,3,3,7-tetramethyl-5-acetylamino-2-methylene-indoline, 1-ethyl-3,3-dimethyl-5-acetylamino-2-methylene-indoline, 1-chloroethyl-3,3-dimethyl-5-acetylamino-2-methylene-indoline, 1-acetoxyethyl-3,3-dimethyl-5-acetylamino-2-methylene-indoline and 1-hydroxyethyl-3,3-dimethyl-5-acetylamino-2-methyleneindoline.

Starting materials for preparing polymeric cationic hydrazone dyestuffs of the general formula VI correspond to the general formula

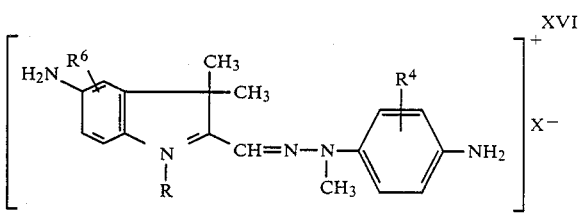

wherein R, $R^5$, $R^6$ and X have the same meaning as in the formula VI.

These compounds are obtained by diazotising compounds of the general formula XI, coupling the diazotised product with compounds of the general formula XV to give azo dyestuffs, converting these azo dyestuffs into the corresponding dye bases, alkylating these dye bases, and splitting off the acetyl groups by heating in an acidic medium.

The reaction of these starting materials with compounds of the formula VIII to give dyestuffs according to the invention is carried out in aqueous or organic solvents. Those solvents are preferable which are miscible with water, such as acetone, dioxane, tetrahydrofuran, dimethylformamide or dimethylacetamide.

Examples of suitable acid-binding agents are sodium bicarbonate, potassium bicarbonate, sodium carbonate, potassium carbonate, magnesium oxide, triethylamine and triisopropanolamine.

The reaction is preferably carried out within a temperature range between 0° and 100° C.

The dyestuffs are suitable for dyeing anionically modified synthetic fibres, in particular for dyeing polyacrylonitrile materials. Excellent light fastness values are obtained on these fibre materials. The dyestuffs are particularly suitable for dyeing during the spinning process, since the dyestuffs do not bleed into the stretching bath. The dyestuffs are also suitable for dyeing acid-modified polyester fibres and natural fibre materials, such as cotton, viscose staple or leather. These dyestuffs are very particularly suitable for dyeing paper containing mechanical wood pulp, and bleached sulphite pulp, and the dyestuffs have high affinity for the latter and a good light fastness thereon.

EXAMPLE 1

39.1 g of the dyestuff of the formula

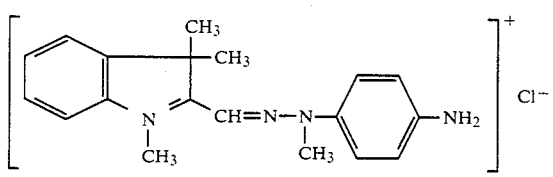

which was obtained by reacting diazotised 4-aminoacetanilide with 1,3,3-trimethyl-2-methyleneindoline, converting the azo dyestuff into the dye base, quaternising with dimethyl sulphate and hydrolysing the acetyl group with aqueous hydrochloric acid, and contains 13.5% of water, are stirred in 500 ml of water. A solution of 9.3 g of cyanuric chloride in 100 g of acetone is allowed to flow in, the temperature rising up to 29° C. By adding, dropwise, 20% strength sodium carbonate solution the pH is maintained at a value of 5. When the reaction mixture has been stirred for one hour at room temperature it is heated to 70° C., whereupon the dyestuff suspension dissolves. The mixture is then stirred for 2 hours at 70° C. and the pH continues to be maintained at 5 by the dropwise addition of 20% strength sodium carbonate solution. The total consumption of 20% strength sodium carbonate solution is 50 ml. The reaction mixture is then allowed to cool down and return to room temperature, and 50 ml of a 10% strength sodium hydroxide solution are added, until a brilliant alkaline reaction is obtained. The suspension of the carbinol base is stirred overnight at room temperature and filtered with suction, and the filter cake is washed with 500 ml of water. After the mixture has been stirred for several hours, 39.4 g are obtained of the moist carbinol base which contains 10.1% of water. This carbinol base is stirred overnight at room temperature together with 48.4 g of water and 88.8 g of glacial acetic acid, and the dark red solution is filtered. 177 g are obtained of a solution of the dyestuff of the formula

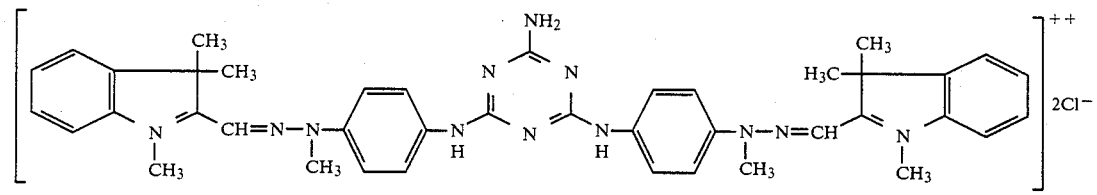

which dyes bleached sulphite pulp in a brilliant orange which has good light fastness (C.I. hue indication chart No. 6).

λ max: 432 nm (H₂O).

EXAMPLE 2

9.3 g of cyanuric chloride dissolved in 100 g of acetone are added to 150 g of ice water. A solution of 17.2 g of the starting dyestuff used in Example 1 in 500 ml of water is then added at about 5° C., and the mixture is stirred at room temperature of pH 4–5 until the first condensation has ended. The acid liberated is neutralised with 15 ml of a 20% strength sodium carbonate solution. A further 17.2 g of the starting dyestuff described above are then added dissolved in 500 ml of water, the mixture is heated to 50° C., and the pH is maintained at 5 by adding 10 ml of a 20% strength sodium carbonate solution. When the reaction mixture has been stirred for 2 hours at 50° C., the temperature is raised to 100° C., and the pH is adjusted to 7 by adding ammonia. After stirring for 6 hours the dyestuff is salted out with 120 g of sodium chloride, filtered off with suction, and washed with 300 ml of a 5% strength sodium chloride solution.

The dyestuff of the formula dyes paper in a brilliant orange (C.I. hue indication chart No. 6).

λ max: 458 nm (CH₃OH)

Similar good results are obtained when ammonia is replaced by 2-aminoethanol, n-butylamine, 3-dimethylaminopropylamine, triethylenetetramine, N-methyl-N-3-aminopropylethanolamine, N,N-dimethylethylenediamine, diethanolamine, 1,2-diaminoethane, 2,5-diamino-2,5-dimethylhexane, bis-(2-aminoethyl)-amine, pentaethylenehexamine, bis-(3-aminopropyl)-amine, tetramethylene-1,4-diamine, 1-diethylamino-4-aminopentane, 1-amino-2-diethylaminoethane, N,N′,N″-trimethyldiethylenetriamine, 1,11-diamino-3,6,9-triazundecane, 1-methylamino-3-aminopropane, methybis-(3-aminopropyl)-amine or 1,6-hexamethylenediamine.

EXAMPLE 3

18.6 g of cyanuric chloride are dissolved in 200 g of acetone, and the solution is added to 300 g of ice water. A solution of 34.4 g of the hydrazone dyestuff described as starting material in Example 1 in 1 l of water is then added with cooling at 5° C. The pH is maintained at 4–5 with 32 ml of 20% strength sodium carbonate solution, and the reaction mixture is then stirred for 2 hours at room temperature and pH 5. 7.3 g of methyl-bis-(3-aminopropyl)-amine are then added, the pH increasing

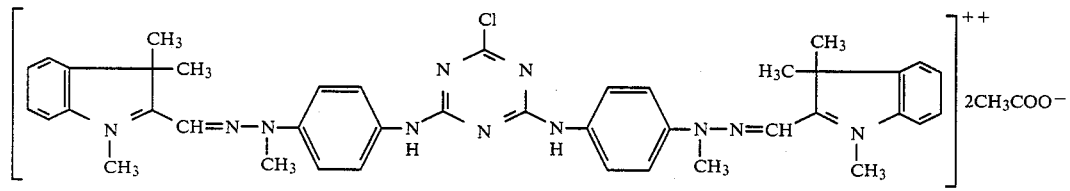

up to a value of 9.8. The reaction mixture is heated to 50° C., whereupon the dyestuff enters into solution. During further stirring for 4 hours at 50° 1 C., the pH value decreases. As soon as it drops below 5, the dropwise addition of sodium carbonate solution is started, and the pH is maintained at a value of 5 by the dropwise addition of 8 ml of sodium carbonate solution. When the mixture has cooled down to room temperature, the dyestuff is salted out with 165 g of sodium chloride, and the dyestuff suspension is stirred for some hours longer and filtered with suction. 49.9 g are obtained of the dyestuff of the formula

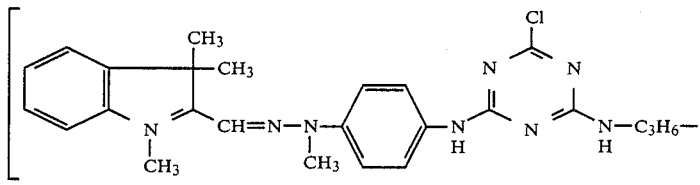

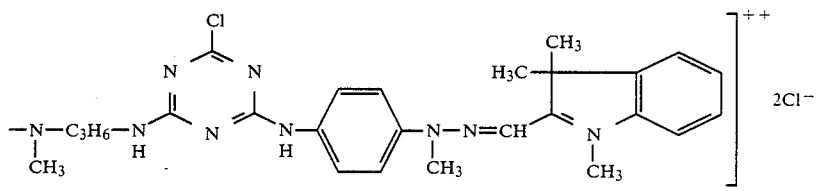

which dyes paper in a clear orange (C.I. hue indication chart No. 6).

80 max: 444 nm (H$_2$O)

Similar good results are obtained when the instructions of this example are followed but methyl-bis-(3-aminopropyl)-amine is replaced in the final stage by 11.6 g of pentaethylenehexamine, 8.0 g of triethylenetetramine, 5.2 g of bis-(2-aminoethyl)-amine, 9.5 g of 1,11-diamino-3,6,9-triazaundecane, 5 g of N,N-dimethylethylenediamine, 5.8 g of 1,6-hexamethylenediamine, 5.4 g of 1,4-diaminobenzene or 5.4 g of 1,3-diaminobenzene.

EXAMPLE 4

9.3 g of cyanuric chloride are dissolved in 100 g of acetone, and the solution is added to 150 g to ice water. A solution in 500 ml of water of 18.7 g of the hydrazone dyestuff of the formula

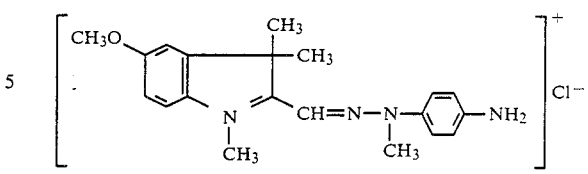

is added to this suspension, and the pH is maintained at a value of 4–5 by the dropwise addition of 18 ml of a 20% strength sodium carbonate solution. After stirring for 4 hours at room temperature a further solution of 18.7 g of the starting dyestuff in 500 ml of water is added, and the reaction mixture is heated to 50° C. The pH is maintained at 5 by the dropwise addition of 7 ml of 20% strength sodium carbonate solution. The reaction mixture is then heated to 100° C. and maintained at this temperature for 6.5 hours, during period the pH is adjusted to a value of 5 by the dropwise addition of 10 ml of 20% strength sodium carbonate solution. When the mixture has cooled down, the dyestuff is salted out, the dyestuff suspension is stirred for a few hours and filtered with suction, and the dyestuff filtered off is washed with 5% strength sodium chloride solution. 34.1 g are obtained of the dyestuff of the formula

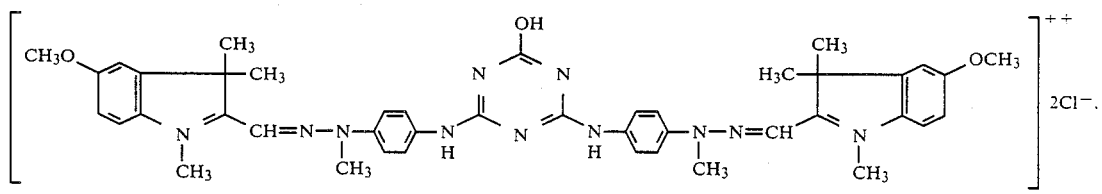

which dyes paper in a deep orange (C.I. hue indication chart No. 6).

λ max 468 nm (CH$_3$OH)

If the above example is followed up to the 2nd addition of the starting dyestuff, the pH is then adjusted to 7 with ammonia, and the mixture heated at 100° C. for 6 hours, during which period the pH is maintained at 6.6 by the addition of further ammonia (a total of 14 ml), and the reaction product is then worked up as described above, a dyestuff is obtained which has the formula

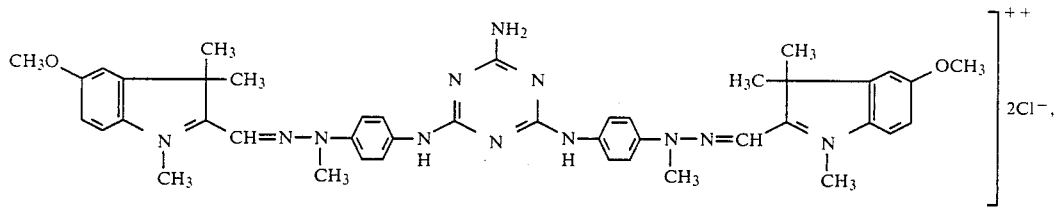

and also dyes paper in a deep orange. (C.I. hue indication chart No. 6).

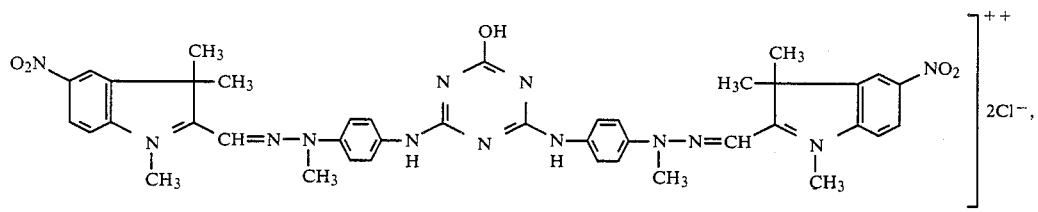

80 max: 444 nm (H₂O)

If, in the final stage, ammonia is replaced by 4 g of 2-aminoethanol, 6.5 g of dimethylaminopropylamine, 7.3 g of N-methyl-N-3-aminopropylethanolamine or 9.0 g of triethylenetetramine and the procedure used in otherwise the same, dyestuffs which dye paper in deep orange shades and likewise obtained.

EXAMPLE 5

9.3 g of cyanuric chloride are dissolved in 100 g of acetone, and the solution is added to 150 g of ice water. 20 g of the hydrazone dyestuff of the formula

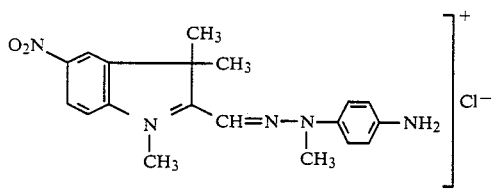

in 500 ml of warm water at 50° C. are added to this suspension. In the meantime the pH is maintained at a value of 4–5 with 30 ml of 20% strength sodium carbonate solution. The mixture is stirred at room temperature for 2 hours, and a further solution of 20 g of the starting dyestuff in 500 ml of hot water is added. The reaction mixture is then heated to 50° C., and adjusted to pH 5 by adding 16 ml of 20% strength sodium carbonate solution. After 2 hours the solution is heated to 100° C. and stirred at 100° C. for 6 hours, during which period the pH is maintained at a value of 5 by adding 11 ml of 20% strength sodium carbonate solution. When the mixture has cooled down, the dyestuff, which has completely crystallised out, is filtered off with suction and washed with water. 37.7 g are obtained of the dyestuff of the formula which dyes paper in a flat red (C.I. hue indication chart No. 7).

λ max 472 nm (CH₃OH)

If the procedure described in the above example is followed and 4 g of 2-aminoethanol are added (this raises the pH to 8.4) after the 2nd quantity of starting dyestuff has been added and before heating up to 100° C. and the procedure followed is otherwise the same, a dyestuff is obtained which also dyes paper in a flat red (C.I. hue indication chart No. 7).

EXAMPLE 6

9.3 g of cyanuric chloride are dissolved in 100 g of acetone, and the solution is added to 150 g of ice water. 38 g of the hydrazone dyestuff of the formula

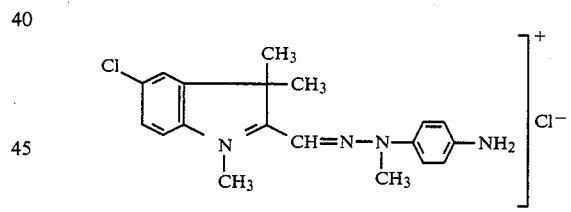

in 1 l of water are added to this suspension in the course of about 30 minutes. The pH is maintained at a value of 4–5 by adding 52 ml of 20% strength sodium carbonate solution, and the mixture is stirred at 50° C. for 6 hours. When the mixture has cooled down to room temperature, the crystallised dyestuff is filtered off with suction and washed with a small amount of water. 38.7 g are obtained of the dyestuff of the formula

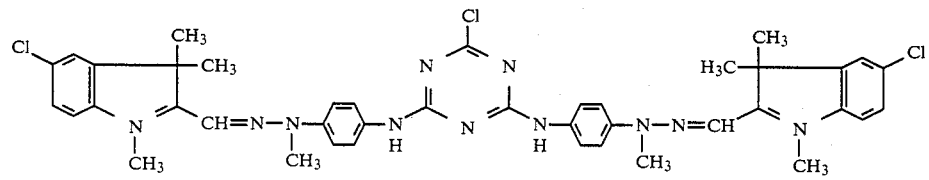

which dyes paper orange (C.I hue indication chart No. 6).

λ max 455 nm (CH₃OH)

EXAMPLE 7

9.3 g of cyanuric chloride are dissolved in 100 g of acetone, and the solution is added to 150 g of ice water. A solution of 19 g of the starting dyestuff described in Example 6 in 500 ml of water is then added at room temperature, the pH being adjusted to a value of 4–5 with 28 ml of 20% strength sodium carbonate solution, followed by the same amount of the starting dyestuff dissolved in 500 ml of water with the reaction temperature being raised to 50° C. 22 ml of 20% strength sodium carbonate solution are required to maintain the pH at 5. 6.5 g of dimethylaminopropylamine are then added, which raises the pH up to a value of 8.2, and the reaction mixture is heated to 100° C. As soon as the pH has dropped to a value of 5.7, a further 1.5 g of dimethylaminopropylamine are added. After the reaction mixture has stirred at 100° C. for 6 hours, it is allowed to cool down to room temperature, and the dyestuff is filtered off with suction and washed with a small amount of water. 38.2 g are obtained of the dyestuff of the formula

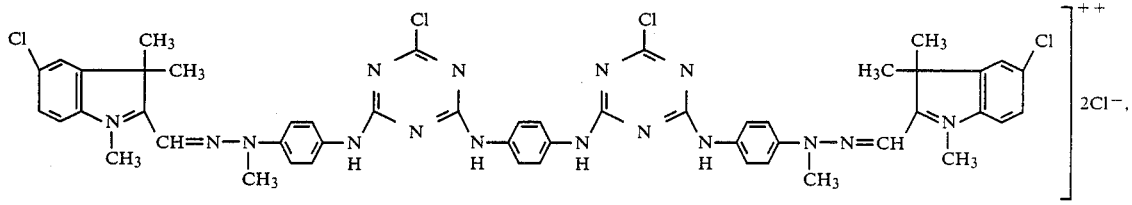

which dyes paper in a reddish-tinged orange (C.I. hue indication chart No. 6).

λ max 465 nm (CH₃OH)

If dimethylaminopropylamine is replaced by 5 g of 1,2-diaminoethane, 9 g of triethylenetetramine, 6.5 g of 1-amino-2-diethylaminoethane or 7.3 g of N-methyl-N-3-aminopropylethanolamine and the procedure followed is otherwise the same, dyestuffs which dye paper in orange shades are likewise obtained.

EXAMPLE 8

18.6 g of cyanuric chloride are dissolved in 200 g of acetone, and the solution is added to 300 g of ice water. A solution of 38 g of the starting dyestuff described in Example 6 in 1 l of warm water at 50° C. is added with cooling in the course of half an hour, during which the reaction temperature should remain below 5° C. The pH is maintained at a value of 5 by adding 55 ml of 20% strength sodium carbonate solution. When the mixture has been stirred at room temperature for 2 hours, 5.4 g of 1,4-diaminobenzene dissolved in 40 g of acetone are added, and the reaction mixture is heated to 50° C. The pH is maintained at a value of 5 by the dropwise addition of 30 ml of 20% strength sodium carbonate solution. The mixture is then stirred at 50° C. for 2 hours and at 75° C. for 6 hours and cooled down to room temperature, and the dyestuff formed is filtered off with suction and washed with water. 48.5 g are obtained of a dyestuff of the formula

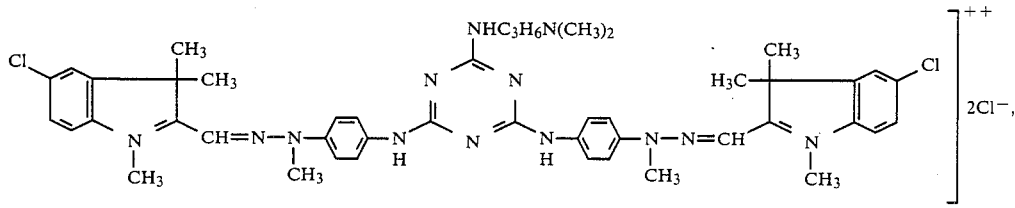

which dyes paper orange (C.I. hue indication chart No. 6).

λ max 458 nm (CH₃OH)

If the procedure given above is followed and 5.4 g of 1,4-diaminobenzene are replaced by 5.4 g of 1,3-diaminobenzene, 7.3 g of methyl-bis-(3-aminopropyl)-amine or 11.6 g of pentaethylenehexamine, valuable dyestuffs which dye paper orange are likewise obtained.

EXAMPLE 9

9.3 g of cyanuric chloride are dissolved in 100 g of acetone, and the solution is added to 100 g of ice water. A 50° C. warm solution of 40.2 g of the hydrazone dyestuff of the formula

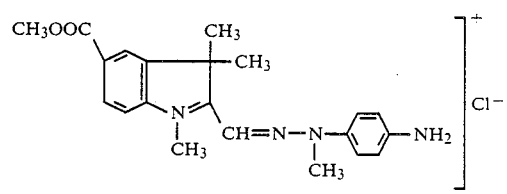

in 1,000 ml of water is added to this suspension in the course of 30 minutes, during which period the pH is maintained at 4–5 by the dropwise addition of 20% strength sodium carbonate solution. Stirring at 50° C. and pH 5 for 6 hours consumed 48 ml of sodium carbonate solution. The dyestuff suspension is stirred at room temperature for some hours, and the dyestuff is filtered off with suction and washed with water. 34.9 g are obtained of the dyestuff of the formula

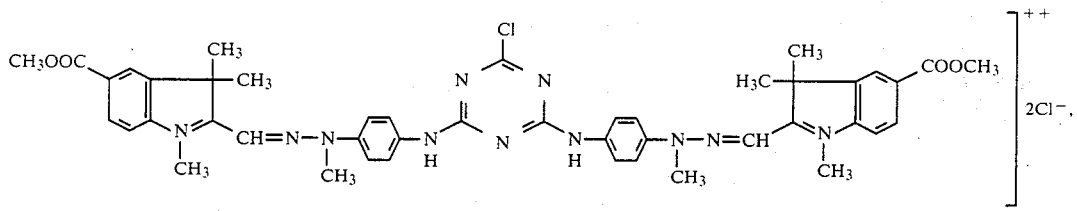

which dyes paper orange (C.I. hue indication chart No. 6).

λ max 457 nm (CH₃OH)

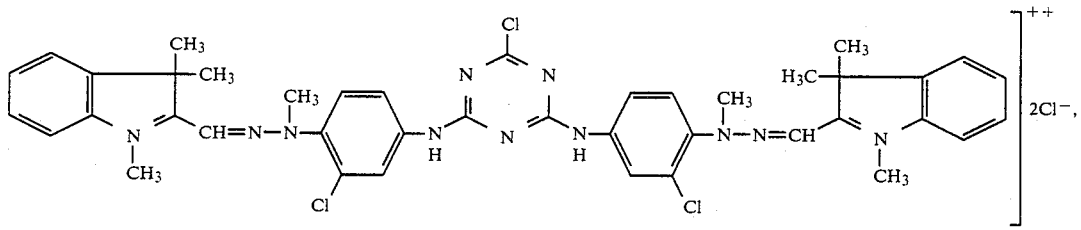

If the procedure given above is followed, except that after 2 hours' stirring at 50° C. 6.5 g of dimethylaminopropylamine are added, the pH rising up to a value of 9.1, the mixture is stirred at 100° C. for 6 hours, the dyestuff is salted out with 100 g of sodium chloride, the suspension is cooled down to room temperature and filtered with suction, and the residue is dried in vacuo, a dyestuff which dyes paper orange is likewise obtained.

EXAMPLE 10

9.3 g of cyanuric chloride are dissolved in 100 g of acetone, and the solution is added to 100 g of ice water. A solution of 38 g of the dyestuff of the formula

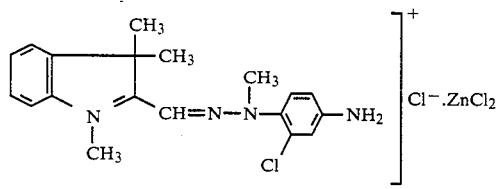

in 2 l of warm water at 50° C. is allowed to flow in during 40 minutes, while, at the same time, the pH is maintained at 4–5 by the dropwise addition of 20% strength sodium carbonate solution. The mixture is stirred at 50° C. for 6 hours, during which period the pH is maintained at 5 by further dropwise addition of sodium carbonate solution. When the batch has cooled down to room temperature, the dyestuff is salted out with 110 g of sodium chloride, filtered off with suction after stirring for several hours, and washed with 500 ml of 10% strength sodium chloride solution. 48.3 g are obtained of the dyestuff of the formula which dyes paper greenish-tinged yellow (C.I. hue indication chart No. 2).

λ max 402 nm (CH₃OH)

EXAMPLE 11

9.3 g of cyanuric chloride are dissolved in 100 g of acetone, and the solution is added to 150 g of ice water. 19 g of the starting dyestuff used in Example 10 are then added as a solution in 1 l of warm water at 50° C., and the pH is maintained at a value of 4–5 by the dropwise addition of 20 ml of 20% strength sodium carbonate solution. When the mixture has stirred at room temperature for 2 hours, a further solution of 19 g of the starting dyestuff described in Example 10 in 1 l of water at 50° C. is added, and the reaction mixture is stirred at 50° C. for 2.5 hours, during which the pH is maintained at 5 by the addition of 10 ml of 20% strength sodium carbonate solution. 6.5 g of dimethylaminopropylamine are then added to the reaction mixture, whereupon the pH rises up to a value of 8.3. When the mixture has been stirred at 100° C. for 6 hours, the pH is 7.5. When the batch has cooled down to room temperature, the dyestuff is salted out with 160 g of sodium chloride, the suspension is stirred for some time, and the residue is filtered off with suction and washed with 500 ml of 10% strength sodium chloride solution. 48.6 g are obtained of the dyestuff of the formula

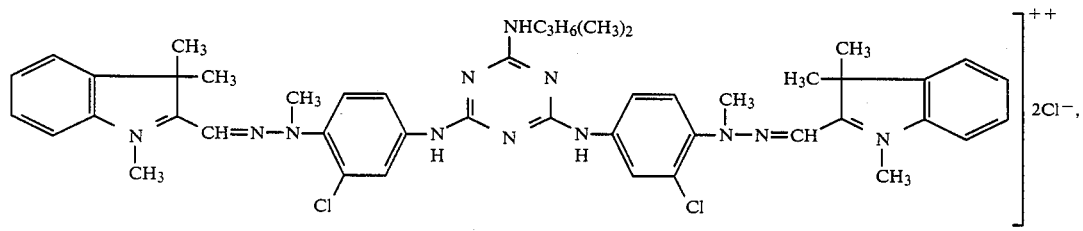

which dyes paper greenish-tinged yellow (C.I. hue indication chart No. 2).

λ max 401 nm (CH₃OH)

If the procedure described above is followed and 6.5 g of dimethylaminopropylamine are replaced by 5 g of 1,2-diaminoethane or 9.0 g of triethylenetetramine, valuable dyestuffs which dye paper in greenish-tinged yellow shades are likewise obtained.

EXAMPLE 12

9.3 g of cyanuric chloride are dissolved in 100 g of acetone, and the solution is added to 150 g of ice water. 37.4 g of the dyestuff of the formula

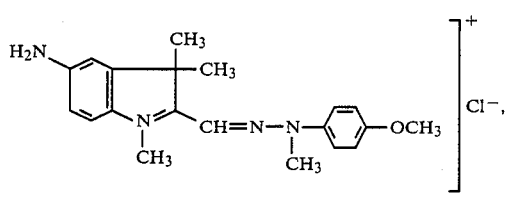

are added to this suspension in the form of a solution in 1,000 ml of water. The pH is maintained at a value of 4–5 by adding 20% strength sodium carbonate solution. The suspension is heated to 60° C., whereupon the dyestuff enters into solution. The pH is maintained at 5 by the further addition of 20% strength sodium carbonate solution. A total of 35 ml of 20% strength sodium carbonate solution is consumed. When the batch has cooled down, the dyestuff is salted out with 45 g of sodium chloride, filtered off with suction when the batch has been stirred for several hours, and washed with 5% strength sodium chloride solution. 36.5 g are obtained of a dyestuff of the formula

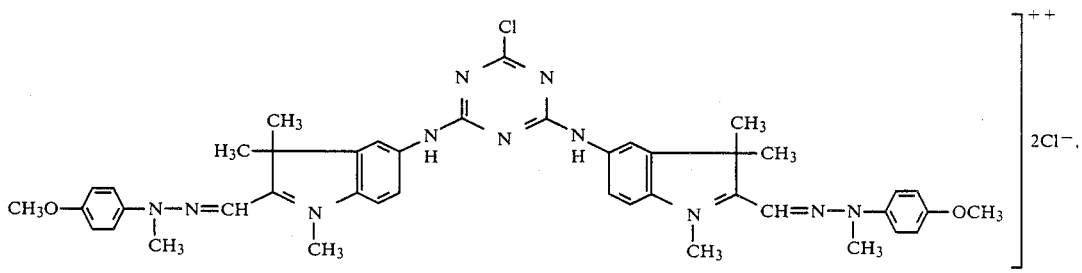

which dyes paper in a brilliant orange (C.I. hue indication chart No. 6).

λ max 448 nm (CH₃OH)

If the starting dyestuff which is given above and which contains 4-anisidine as diazo component is replaced by starting dyestuffs which are obtained by diazotising aniline, 2-toluidine, 4-toluidine, 2-anisidine, 2,4-dimethoxyaniline or 2,5-dimethoxyaniline and coupling onto 1,3,3-trimethyl-5-acetylamino-2-methyleneindoline, converting the azo dyestuff into the dye base, methylating with dimethyl sulphate and hydrolysing the acetylamino group in an aqueous, acidic solution and the procedure used is otherwise the same, valuable dyestuffs which dye paper in yellow, golden yellow and orange shades are likewise obtained.

EXAMPLE 13

9.3 g of cyanuric chloride are dissolved in 100 g of acetone, and the solution is added to 150 g of ice water. 17.9 g of the starting dyestuff of the formula

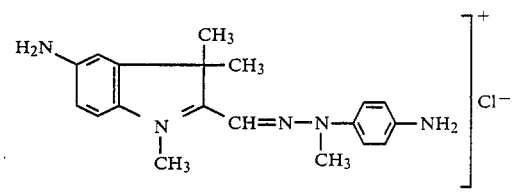

is added to this suspension in the form of a solution in 500 ml of water. The pH is maintained at a value of 5 by the simultaneous dropwise addition of 20% strength sodium carbonate solution. The reaction mixture is heated to 50° C. and maintained at this temperature for 6 hours, during which period the pH is maintained at 5 by the further dropwise addition of 20% strength sodium carbonate solution. A total of 32 ml of 20% strength sodium carbonate solution is consumed. When the batch has cooled down, the dyestuff is salted out with 25 g of sodium chloride, filtered off with suction after stirring for several hours and dried in vacuo. 16.8 g are obtained of the dyestuff of the formula

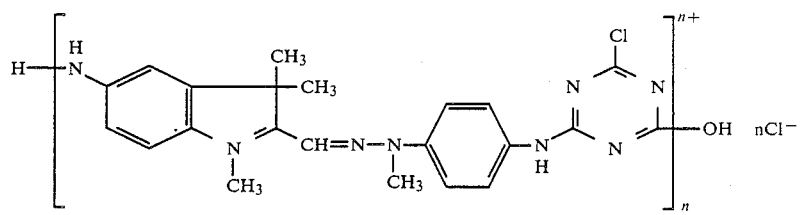

which dyes paper in a deep orange (Colour Index hue indication chart No. 6).

λ max 452 nm (CH₃OH)

EXAMPLE 14

34.3 g of the starting dyestuff described in Example 1 are dissolved in 1,000 ml of water with heating, and the solution is then cooled down to 5°–10° C. A solution of 10.2 g of terephthaloyl dichloride in 100 g of acetone is added dropwise at 5°–10° C. in the course of 1 hour and, at the same time, the pH is maintained at between 5 and 6 by the dropwise addition of 10% strength NaOH. The temperature is allowed to rise to room temperature, and the batch is stirred at pH 5–6 for a further 4 hours. A total of 37 ml of 10% strength NaOH is consumed. When the batch has been stirred for several hours, the dyestuff is filtered off with suction and washed with 500 ml of 5% strength sodium chloride solution. 33.2 g are obtained of a dyestuff of the formula

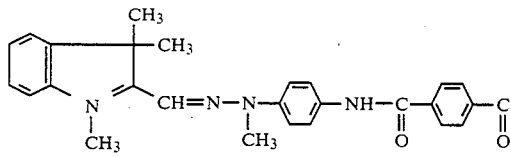

which dyes paper in a yellowish-tinged orange. (C.I. hue indication chart No. 5).

λ max 440 nm (H$_2$O)

If terephthaloyl dichloride is replaced by the same amount of isophthaloyl dichloride or 11.9 g of 4-chloroisophthaloyl dichloride, valuable dyestuffs which dye paper yellowish-tinged orange are likewise obtained. (C.I. hue indication chart No. 5).

EXAMPLE 15

34.3 g of the starting dyestuff used in Example 1 are dissolved in 1,000 ml of water with heating. Phosgene is passed in at 30°–40° C. and pH 5–7 until starting dyestuff is no longer detectable in a thin layer chromatogram. The reaction product crystallises out when phosgene has been passed in for 35 minutes. Phosgene was passed in for a total of 2 hours. Excess phosgene is flushed away overnight with nitrogen, and the dyestuff of the formula

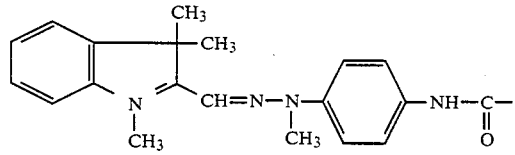

is filtered off with suction. It is stirred with 1 l of water and converted into the carbinol base by adding 42 ml of 10% strength sodium hydroxide solution, and after the batch has been stirred at room temperature for 3 hours the carbinol base is filtered off with suction and washed until neutral. 20 g of this carbinol base are stirred at 70° C. for 1 hour together with 80 g of glacial acetic acid, and when the batch has cooled down to room temperature it is filtered. The dyestuff solution thus obtained is suitable for dyeing paper in a deep orange (C.I. hue indication chart No. 6).

λ max 462 nm (CH$_3$OH).

Similar valuable dyestuffs are obtained when the starting dyestuff described above is replaced by the starting dyestuffs described in Examples 4, 6 and 10.

EXAMPLE 16

A dry stuff which consists of bleached sulphite pulp is beaten with sufficient water in a Hollander and milled to a degree of freeness of 40° Schopper-Riegler that the solids content is slightly above 2.5%, and the slush pulp is then adjusted with water to a solids content of exactly 2.5%. 5 g of a 0.25% strength aqueous solution of the dyestuff of Example 1 are added to 200 g of this slush pulp, and the mixture is stirred for about 5 minutes. The material is diluted with about 500 g of water to 700 ml, and is used to produce in the customary manner sheets of paper by sucking off over a sheet former. The sheets are dyed intensely orange. Photometry shows the sheet former effluent to contain about 7% of dyestuff not fixed to the paper.

I claim:

1. A cationic hydrazone dyestuff of the general formula

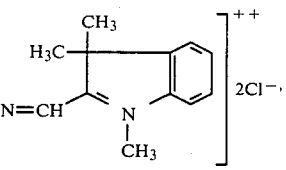

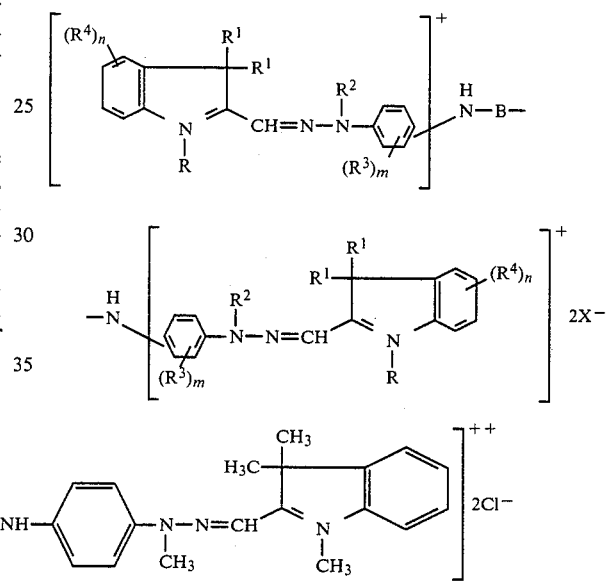

in which

R represents an alkyl radical which has 1 to 4 C atoms and is optionally substituted by hydroxyl, alkoxy having 1 to 4 C atoms, acetyloxy, propionyloxy, benzoyloxy, carbamoyloxy, halogen, cyano, carboxyl, C$_1$- to C$_4$-carbalkoxy, carboxamido or acetyl, R$^1$ represents an alkyl radical which has 1 to 4 C atoms and the two radicals can also form a closed ring, R$^2$ represents an alkyl radical which has 1 to 4 C atoms and which can be substituted by hydroxyl, R$^3$ represents an alkyl radical having 1 to 4 C atoms, an alkoxy radical having 1 to 4 C atoms or halogen, R$^4$ represents an alkyl radical having 1 to 4 C atoms, halogen, alkoxy having 1 to 4 C atoms, phenoxy, benzyloxy, benzyl, carboxyl, an alkyl carboxylate having 1 to 4 C atoms, a carboxamide group which is optionally substituted by 1 or 2 C$_1$- to C$_4$-alkyl radicals, a sulphonamide group which is optionally substituted by 1 or 2 C$_1$- to C$_4$-alkyl radicals, alkylsulphonyl having 1 to 4 C atoms, phenylsulphonyl or a cyano, nitro, trifluoromethyl, acetyl or benzoyl group, B corresponds to a radical of the formulae

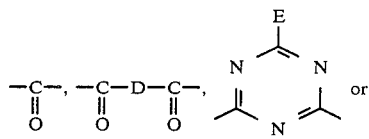  or

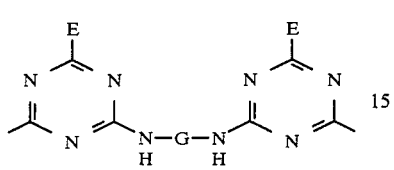

in which
D represents an alkylene radical having 2 to 6 C atoms or a phenylene or a naphthylene radical,
E represents halogen, hydroxyl, alkoxy having 1–4 C atoms or the radical

Z and $Z^1$ independently of each other represent hydrogen or the radical $-Y-Z^2$,
Y represents alkylene having 1 to 6 C atoms,
$Z^2$ represents hydrogen, hydroxyl, pyridinium or the radicals

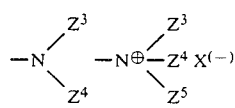

$Z^3$, $Z^4$ and $Z^5$ independently of one another represent hydrogen or optionally hydroxyl-substituted alkyl having 1 to 4 C atoms,
$Z^3$ also represents phenyl, benzyl or the radical

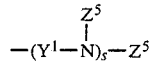

$Y^1$ represents alkylene having 2–4 C atoms and
s represents 1–8, or
Z and $Z^1$ as well as $Z^3$ and $Z^4$, together with their N atom, may form the pyrrolidino, morpholino, piperidino or piperazino radicals which can be substituted by $C_1$- to $C_4$-alkyl or amino-$C_1$- to $C_4$-alkyl,
G represents an alkylene radical having 2 to 6 C atoms, a phenylene radical or a radical of the formula

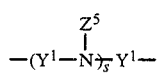

m and n represent 0, 1 or 2 and
$X^{(-)}$ represents an anion.

2. A cationic hydrazone dyestuff of the general formula

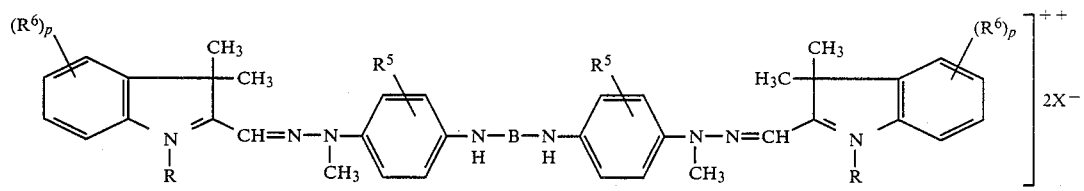

wherein
R, B and X have the same meaning as in claim 1,
$R^5$ represents hydrogen, methyl or chlorine,
$R^6$ represents hydrogen, chlorine, methyl, methoxy or ethoxy, and
p represents 0 or 1.

3. A cationic hydrazone dyestuff of the general formula

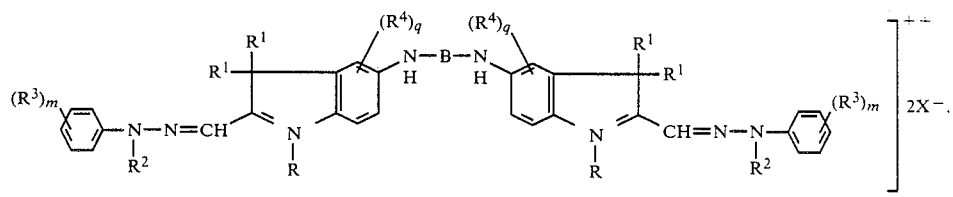

wherein
R, $R^1$, $R^2$, $R^3$, $R^4$, B, X and m have the meanings given in claim 1 and
q represents 0 or 1.

4. A cationic hydrazone dyestuff of the general formula

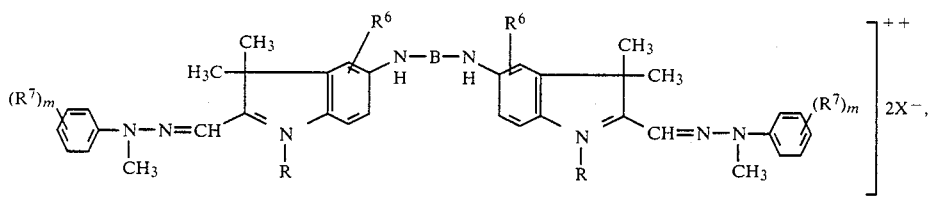

wherein
R, B, X and m have the meanings of claim 1, $R^6$ represents hydrogen, chlorine, methyl, methoxy or ethoxy, and
$R^7$ represents hydrogen, chlorine, methyl, methoxy or ethoxy.

5. A polymeric cationic hydrazone compound of the general formula

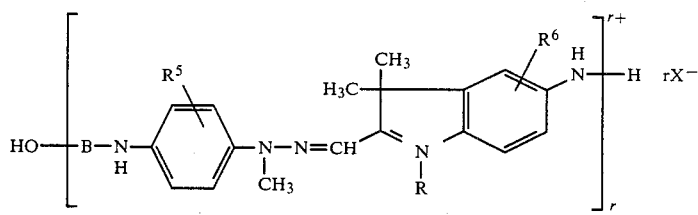

wherein
R, B and X have the meanings given in claim 1,
$R^5$ represents hydrogen, methyl or chlorine,
$R^6$ represents hydrogen, chlorine, methyl, methoxy or ethoxy, and
r represents 2 to 6.

* * * * *